Sept. 9, 1930.   H. POPELSKY   1,775,498
AUTOMATIC WINDOW MODELING DEVICE
Original Filed Oct. 21, 1927   2 Sheets-Sheet 1
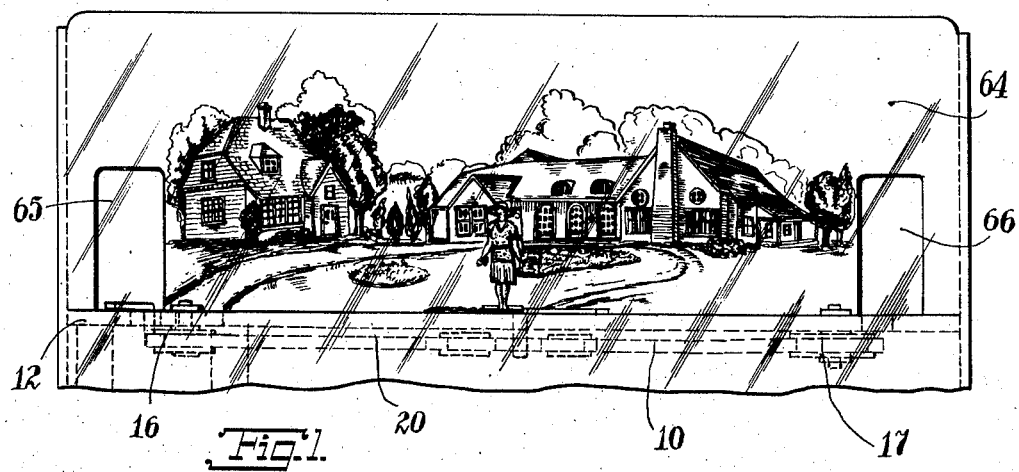
Fig. 1.
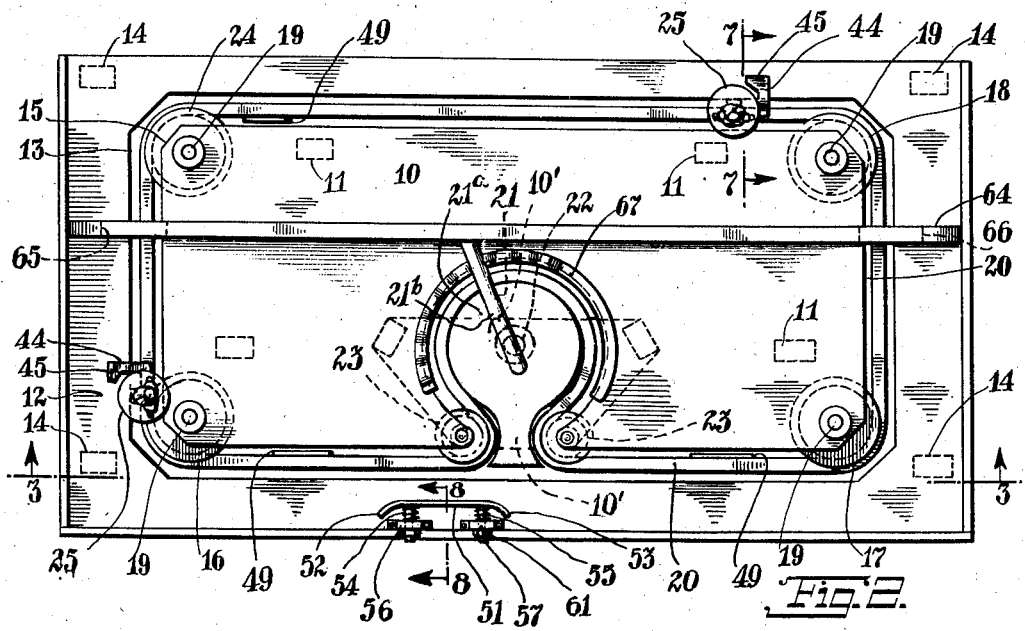
Fig. 2.
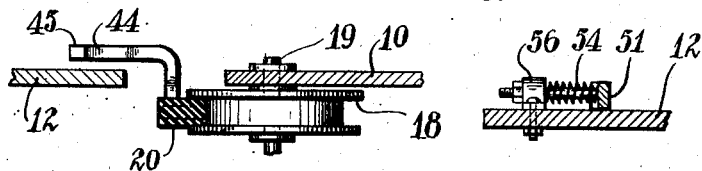
Fig. 7.
Fig. 8.
INVENTOR
Herman Popelsky
BY
ATTORNEY Sept. 9, 1930.   H. POPELSKY   1,775,498
AUTOMATIC WINDOW MODELING DEVICE
Original Filed Oct. 21, 1927   2 Sheets-Sheet 2
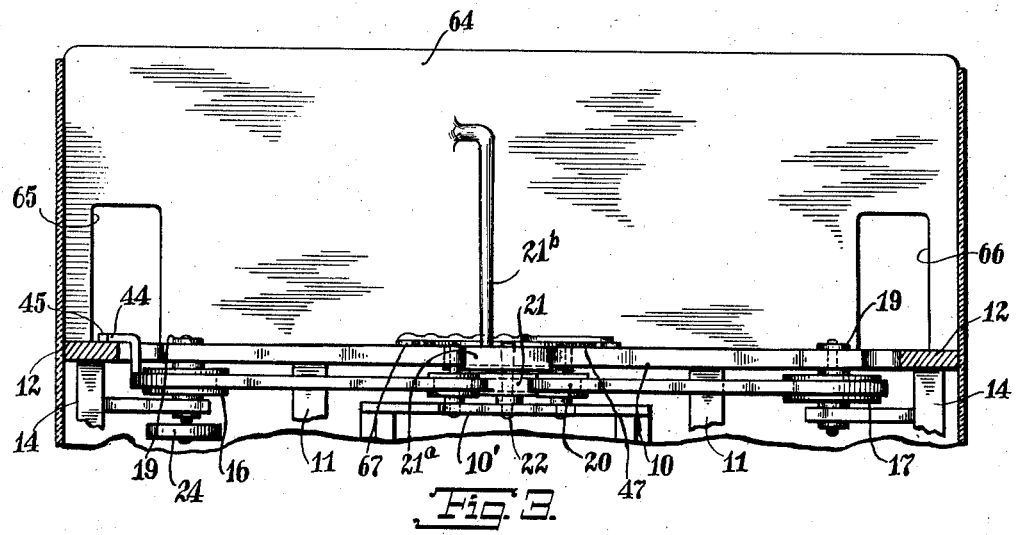
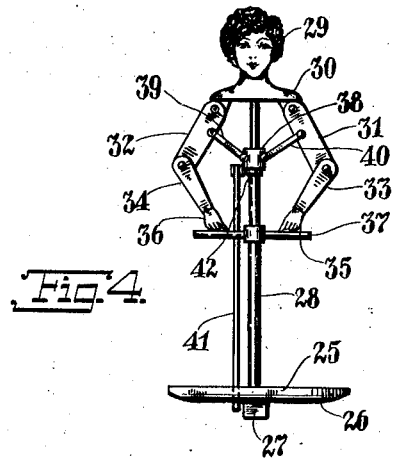
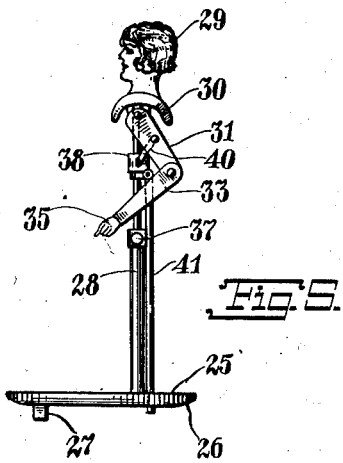
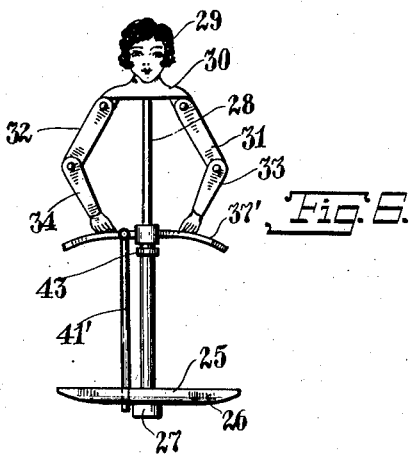
INVENTOR
Herman Popelsky
BY
ATTORNEY Patented Sept. 9, 1930

1,775,498

UNITED STATES PATENT OFFICE

HERMAN POPELSKY, OF BROOKLYN, NEW YORK

AUTOMATIC WINDOW MODELING DEVICE

Substitute for application Serial No. 227,659, filed October 21, 1927. This application filed August 16, 1929.
Serial No. 386,263.

This invention relates to a new and useful device in the nature of an automatic window model display. The said device is adapted for store windows, show-cases and the like for the purpose of displaying clothing, such as coats, dresses, gowns, wraps, or the like, on movable models, said movable models appearing and disappearing and performing certain movements, as a means of more effectively displaying the said clothing worn by the models.

The present invention was disclosed by me in a previous abandoned application for a patent filed on October 21, 1927, Serial No. 227,659.

The object of the invention is to provide an automatic window model display device of novel construction and arrangement of parts, hereinafter more fully described, claimed and illustrated in the following description, accompanying claims and in the drawing.

Fig. 1 is a front elevational view of my improved device as same would appear when in use.

Fig. 2 is a top plan view thereof.

Fig. 3 is a longitudinal sectional view taken on the line 3—3 of Fig. 2.

Fig. 4 is a front elevational view of the movable model as embodied in my improved device.

Fig. 5 is a side elevational view thereof.

Fig. 6 is a similar view to that shown in Fig. 4 illustrating another form of the movable model.

Fig. 7 is a fragmentary transverse sectional view taken on the line 7—7 of Fig. 2.

Fig. 8 is a similar view taken on the line 8—8 of Fig. 2.

As here embodied my improved automatic window model display device comprises a base member 10, preferably of rectangular shape, and mounted on the supports 11 or feet. The outer base member 12 of similar shape to the base member 10 is comparatively larger, and has its center portion removed, to receive the base member 10, and so as to provide a space 13 between the inner and outer edges of the said outer base member and the said base member at the four sides thereof. The outer base member 12 is mounted on the supports 14 or feet, in line with the base member 10. Pulleys 15, 16, 17 and 18 are rotatively mounted on the studs 19, secured to the corners of the base member 10 by supports 10' from the base. The pulleys 15, 16, 17 and 18 are provided with the usual flanges, as a means of providing a suitable recess, adapted to receive the endless flexible member 20, which is extended over the said pulleys. It should be understood that the above mentioned pulleys are positioned so as to permit the flexible member 20, to be positioned intermediate the said space 13, between the base member 10 and the outer base member 12.

A main pulley member 21 is secured to the pin 22, rotatively mounted in the center front portion of the base member 10, intermediate the said pulleys 16 and 17. Two small pulleys 23 are rotatably arranged in front of pulley 21 and the flexible member 20 engages the pulleys 23 and also pulley 21. An island 21ª is fixedly held above wheel 21 by a brace 21ᵇ secured to a member 64, so as to provide a passage between base 10 and the island. A pulley 24 is secured to the pulley 15 adapted to receive a flexible member, extended over a pulley attached to an electric motor or any desired prime mover, the latter mentioned elements not being shown in the accompanying drawing. The above described construction is such as will permit the flexible member 20 to be driven.

In Figs. 4 and 5, I have illustrated one of the models as embodied in my improved device, and which comprises a base member 25, having a slightly curved or convex bottom 26. The base member 25 is provided with a lug element 27 projecting downwardly therefrom. The upright member 28 is secured to the base member 25 and has attached thereto, at its upper extended extremity a head 29, similar to a doll's head, representing a woman, man or child, as may be desired. The head 29 is provided with a lower portion 30 or shoulders. The upper arm members 31 and 32 are pivotally attached to the said shoulders 30 and have pivotally attached thereto the lower arm members 33 and 34, respectively, provided with the hand elements 35 and 36.

The transverse member 37 is secured, intermediately thereto, at or near the center of the upright member 28. The above described construction is such as will provide a suitable model, upon which a coat, dress, wraps, or a pair of pants may be placed, so as to represent a woman, child or a man. The collar 38 is slidably mounted on the upright member 28. The links 39 and 40 are pivotally attached to the collar 38 and the said upper arm members 31 and 32, respectively. The vertical rod 41 is pivotally attached to the collar 38 and extends downwardly therefrom, through an aperature formed in the said base member 25. The collar 42 is secured to the upright member 28 so as to normally hold the first mentioned collar 38 in place on the upright member 28.

In Fig. 6 of the accompanying drawing, I have shown the vertical rod 41' pivotally attached to the transverse member 37' slidably mounted on the upright member 28. The collar 43 is secured to the upright member 28, so as to normally hold the transverse member 37 in place on the upright member 28.

The engaging members 44 are secured to and extended outwardly from the flexible member 20 and are provided with enlarged extremities 45, adapted to engage the bases 25 of the models which have their lugs 27 extending into the space between the base and flexible member 20.

An engaging bar 51 is positioned in front of the pulley 21 parallel to the portion of the flexible member 20, intermediate the pulleys 16 and 17, and has its extremities formed or bent outwardly, as at 52 and 53, from the said portion of the flexible member 20. The rods 54 and 55, are secured to the engaging bar 51 and extended therefrom, slidably engaging in apertures formed in the brackets 56 and 57, respectively. The expansion springs 58 and 59 are positioned or wound on the rods 54 and 55, respectively, as a means of tensioning the springs 58 and 59. The latter described construction is such as will permit the engaging bar 51 to engage the bases 25 of the models as they pass and nearly stop the models by nearly stopping the belt 20 due to slippage over the driving pulley 15. The belt 20 now moves very slowly, until a roughened patch 49, several being on the belt, engages the wheel 15, causing additional friction and moving the model clear from the stopping bar 51, and then the belt moves fast again.

The rectangular member 64 is secured to and extended vertically from the base members 10 and 12, and has painted, or otherwise affixed thereto any desired pleasing scenic or panoramic view. The said rectangular member is adapted to extend longitudinally of the said base members 10 and 12, in front of the pulleys 15 and 18, and has formed therein openings 65 and 66, directly over the said space 13, intermediate the said base members 10 and 12.

The operation or functioning of my improved device is as follows: The above mentioned models are placed in front of a member 44, during the time interval or period that the specific engaging member 44 is at the rear of, or behind the rectangular member, hidden from view to the spectators. The said model is carried along by the movement of the flexible member 20 until the engaging bar 51 engages the said base member 25 of the said model, causing the model to momentarily substantially stop. Then a roughened patch 49 passes the pulley 15, forcing the model past the engaging bar 51. The model then makes a turn around island 21ª, then continues and finally disappears behind the said rectangular member 64.

It will be further understood that during the time interval or period that the said model is moving around in a circle, that the extended extremities to the rods 41 or 41' will engage or strike the uneven surface of a ring member 67 which is fastened to the base 10 partially around pulley 21 which will cause the above mentioned arm members 31, 32, 33 and 34 to be raised and lowered, or which will cause the said transverse member 37' to be raised and lowered, as a means of moving the coat or dress, worn by the model, so as to more attractively display the said articles of wearing apparel.

Having thus described my invention, what I claim as new, and desire to secure by United States Letters Patent is:—

1. A device of the class described, comprising a supported inner base and outer base, pulleys mounted on said inner base, a flexible member between the bases and supported on said pulleys, one of said pulleys being driveable to move the flexible member, means including said flexible member for carrying models with enlarged bases, brackets secured to the outer base, rods slidable therein, an engaging bar secured to the rods, springs coaxially arranged on the rods to keep the engaging bar in equilibrium, the said engaging bar being disposed in the path of motion of the bases of said models to momentarily substantially stop them, and roughened patches on the flexible member to increase the friction between the flexible member and its driver pulley to move the models free from the engaging bar.

2. A device of the class described, comprising a supported inner base and outer base, pulleys mounted on said inner base, a flexible member between the bases and supported on said pulleys, one of said pulleys being driveable to move the flexible member, means including said flexible member for carrying models with enlarged bases, an engaging bar resiliently mounted on said outer base and disposed in the path of motion of said bases to momentarily substantially stop the models, and roughened patches on the flexible member to increase the friction between the flexible member and its driver pulley to move the models free from the engaging bar.

In testimony whereof I have affixed my signature.

HERMAN POPELSKY.